Feb. 4, 1930.　　　　G. J. HICKS　　　　1,745,993

MIXING MACHINE

Filed Oct. 17, 1928　　　3 Sheets-Sheet 1

INVENTOR.

BY

ATTORNEY.

Feb. 4, 1930.  G. J. HICKS  1,745,993
MIXING MACHINE
Filed Oct. 17, 1928   3 Sheets-Sheet 2

INVENTOR.
BY
ATTORNEY

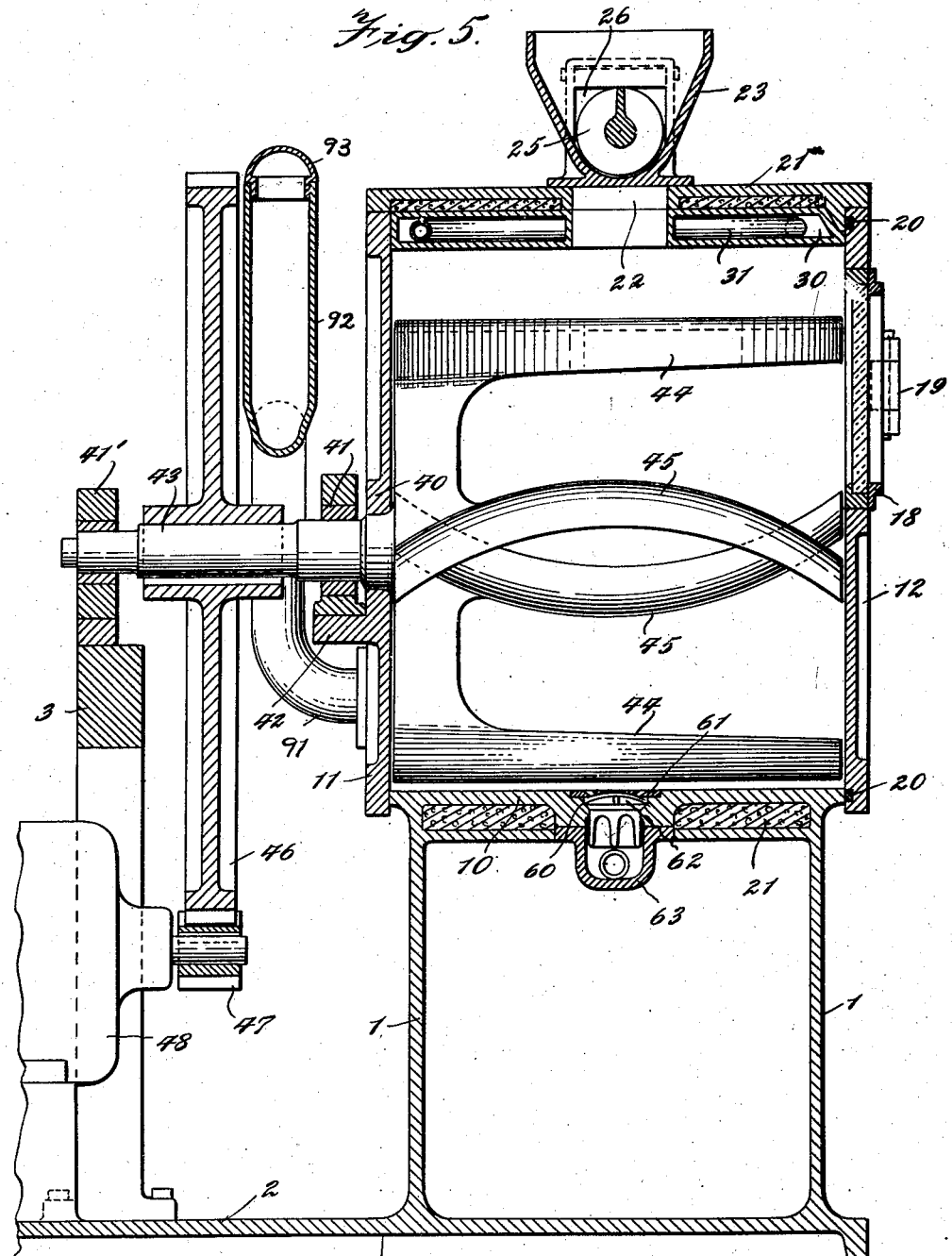

Patented Feb. 4, 1930

1,745,993

UNITED STATES PATENT OFFICE

GEORGE J. HICKS, OF SAGINAW, MICHIGAN

MIXING MACHINE

Application filed October 17, 1928. Serial No. 312,941.

The invention relates to a machine for mixing and conditioning materials, especially comminuted solids and liquids, such as employed in the baking and confectionery arts, and has for its object to provide such machine with a mixing trough having a completely opened end sealed by a closure which admits of the mixed batch being quickly and completely discharged, said trough being provided with a closure having an inlet opening communicating with a feed hopper which supplies the solid ingredients to the trough from above, the feed hopper being provided with a feed screw, the operation of which is controlled by a clutch, the hopper having an inlet opening at its bottom connected with a source of supply of fluid, preferably in the form of a measuring device, to regulate the amount of fluid directed into the bottom of the hopper to mingle with the solid material fed from above, and valved air pressure supply pipes connected to a nozzle directed into the opening between the hopper and the trough to break up and disperse the material fed from the hopper into the trough and also connected to the bottom inlet opening to facilitate the feed of the liquid upward into the trough and to reduce said liquid to a spray-like form to facilitate the immediate admixture thereof with the solid material, means being provided for simultaneously operating the clutch and the valves in the air supply pipes, the trough having a rotary agitator therein to complete the mixing of the ingredients, a special arrangement of temperature regulating coils or pipes being located adjacent and preferably supported by the cover, through which coils a heating or cooling medium may be circulated to maintain the proper conditions of temperature or moisture in the mixture. These and other features of the invention will be more fully described in the following specification, which is predicated on the accompanying drawings, in which:—

Fig. 5 is a lateral sectional elevation.

Figure 1:
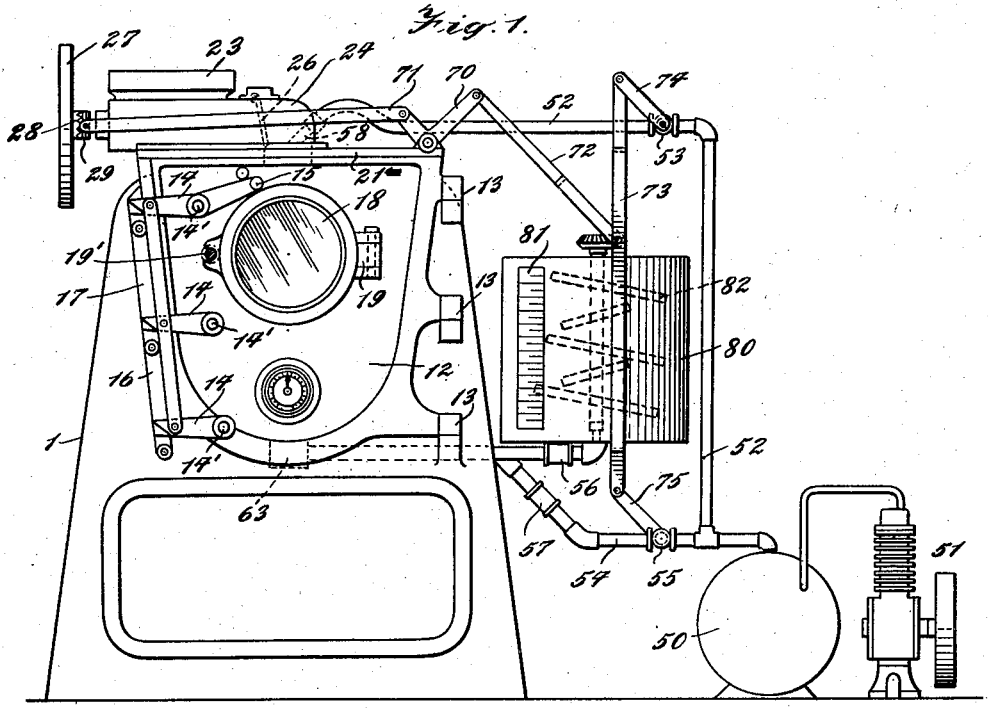
Fig. 1 is a side elevation of the apparatus.
Figure 2:
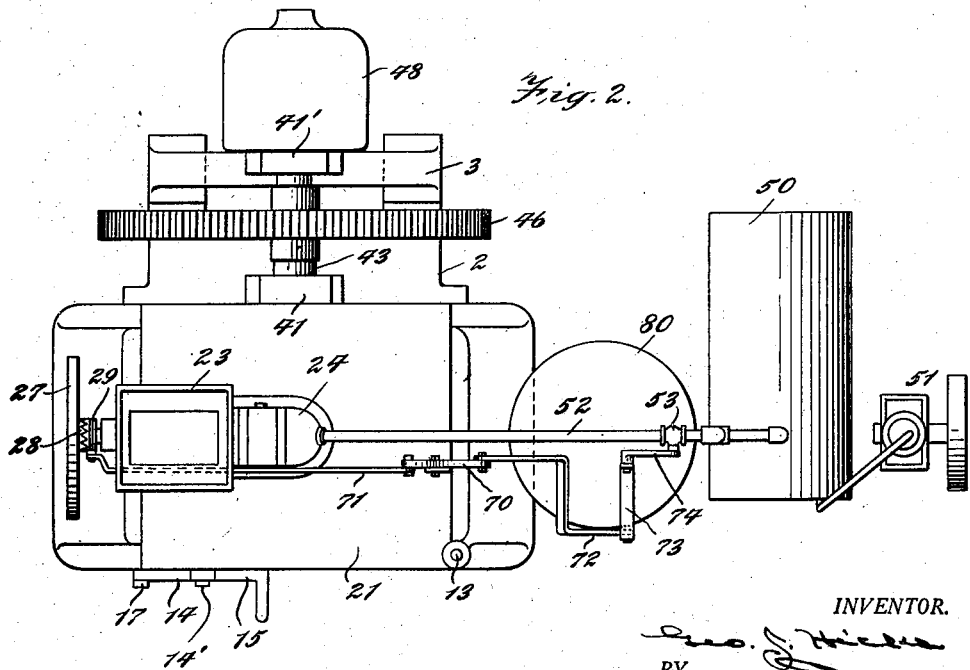
Fig. 2 is a plan view thereof.
Figure 3:
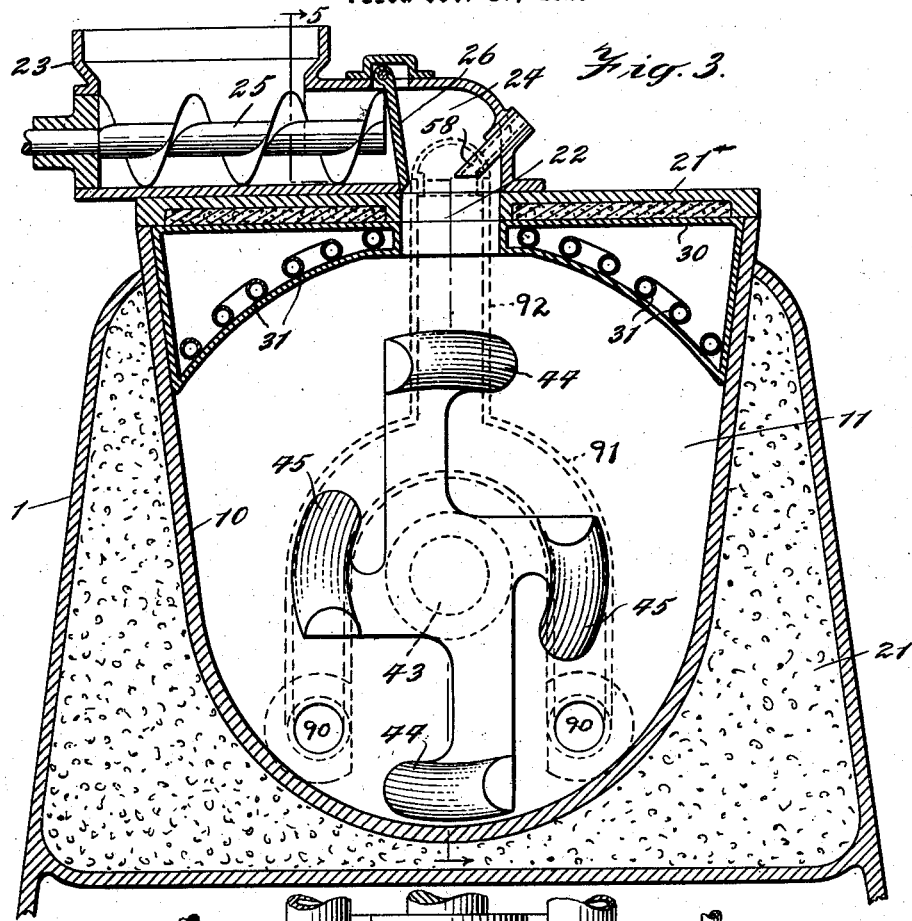
Fig. 3 is a transverse vertical section through the hopper and its associated mechanism.
Figure 4:
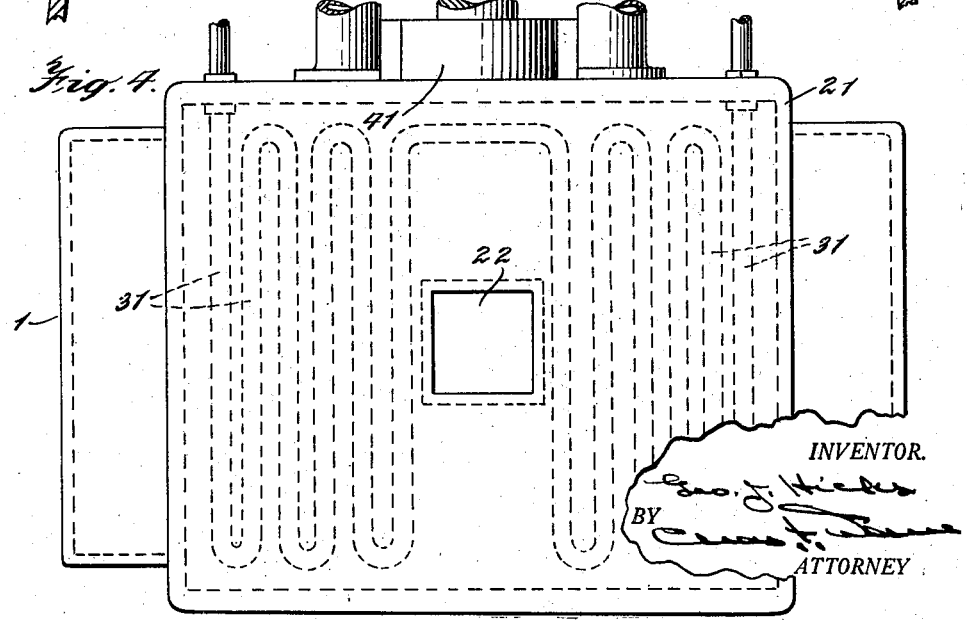
Fig. 4 is a plan view with the feed hopper removed.

Referring to the drawings, 1 indicates the supporting frame of the machine, which is preferably formed as a casting with a rearwardly base extension 2 to which is secured the frame 3, which serves as a support for a shaft bearing. Preferably cast integrally with the frame 1 is a generally U-shaped trough 10 between which and the inner walls of the frame is included a space adapted to be filled with a suitable insulating packing 21, as more particularly illustrated in Fig. 3.

The trough member of the casting is open at each end and the front opening, which constitutes the discharge for the contents of the trough, is provided with a door 12, which is connected to the front wall of the frame by hinges 13, so that the door may be swung to completely open the end of the trough, so that the contents of the latter may be discharged. The door 12 is provided with a series of latches 14 mounted on pivot pins 14', the upper latch being provided with a handle 15 and the several latches being connected by a bar 16, so that all of the latches will be operated simultaneously. The ends of the latches are adapted to be moved into and out of engagement with the keeper bar 17 mounted on the front face of the frame 1, the latches cooperating with the door to force the door into a tightly closed position, the inner face of the door being provided with a groove adjacent the peripheral outer edges thereof to receive a packing strip 20, which abuts the adjacent edges of the trough and serves to seal the joint between the door and the trough against leakage.

The door 12 is provided with a sight opening, which is normally closed by a deadlight 18 having a transparent central portion, said deadlight being connected to the door by a hinge 19 and being locked in position by the usual bolt 19'.

The rear open end of the trough 10 is closed by a plate 11, which is secured to the frame casting by bolts or other suitable means to provide a substantially fluid tight joint with the rear edges of the trough. The plate 11 has formed thereon a hollow boss 40, which affords a passage for the shaft carrying the agitator or stirrer, and adjacent the opening there is formed on the plate 11 a shelf 42 upon which is mounted a journal bearing 41 for the shaft.

The open top of the trough is closed by a top section or cover 21, which is provided with a central opening 22. Secured to the top face of the cover is a supply hopper 23 having a tubular extension 24, the bottom of which registers with the opening 22 in the cover. Mounted in the hopper and the tubular extension thereof is a feed screw 25 to the outer end of which is loosely journalled a driving pulley or gear member 27 which is adapted to be connected to the shaft in operative relation by coordinate clutch members 28 and 29. Pivoted in the tubular extension 24 of the hopper is a flap valve 26, which is moved by the material advanced by the feed screw to permit said material to drop through the opening 22 in the cover and thence into the trough. Mounted in the tubular extension 24 of the hopper is a nozzle 58, so positioned as to direct a jet of air downwardly and laterally in the throat of the opening connecting the hopper with the trough so as to break up and distribute the material fed from the hopper to the trough in order to facilitate the mixture of the material with the water or other fluid supplied to the trough, as will be hereinafter explained.

Mounted in a suitable housing 30, preferably connected to the under face of the cover, is a system of piping 31, preferably arranged in zigzag order with its inlet and discharge ends extending through the rear end closure of the trough. This pipe system or manifold is adapted to be connected to a source of supply of either a heating or cooling medium by means of which the temperature and the humidity of the contents of the mixture may be accurately regulated, the heating or cooling medium being continuously circulated through the piping and the heating or drying effects being transmitted directly to the contents of the trough by radiation and convection.

Journalled in bearings 41 and 41' carried by the rear closure of the trough and the frame 3, respectively, is a shaft 43 which carries a rotary stirrer or agitator comprising cross arms 44 and 45, which are preferably curved longitudinally and extend to a point adjacent the door 12, the longer portions 44 of the stirrer being so disposed as to sweep in close proximity to the curved bottom of the trough, while the shorter arms 45 move in a smaller circle, so that the entire mass of the materials in the trough is thoroughly agitated. Fixed to the shaft 43 is a driving gear 46 which meshes with a pinion 47 fast to the end of the shaft of an electric motor 48 mounted on the base extension 2.

Associated with the mixing device is a source of compressed air, preferably in the form of a compressor 51 connected to a storage tank 50, which latter is connected by piping 52 with the jet nozzle 58 and also by a branch pipe 54 with a housing 63 covering an opening 60 in the bottom of the trough. The pipes 52 and 54 are provided with valves 53 and 55, respectively, for controlling the connection between the air pressure supply and the trough.

The opening 60 in the bottom of the trough is designed to supply the fluid ingredients of the mixture to the trough in a manner best calculated to effect the intimate admixture and incorporation of the ingredients, for which purpose the opening is provided with a plate 61 having a series of outwardly inclined openings therein, so that the liquid will be forced into the trough in the form of jets or sprays, where it will meet the comminuted material delivered from the hopper. The opening 60 is provided with a valve seat with which cooperates a check valve 62, which prevents the back flow of any of the materials from the trough.

Preferably, the fluid portion of the materials to be mixed is supplied to the trough through the bottom opening therein from a measuring device, such as a tank 80, provided with a glazed sight opening with an appropriate scale marking, as indicated at 81, so that the exact amount of liquid to be added to the mixture may be accurately measured and predetermined. In the event that a combination of fluid ingredients is to be employed, the measuring apparatus may be provided with a suitable stirrer, such as 82, which will thoroughly admix the liquids before the same are delivered to the trough. The bottom of the measuring device 80 is connected to the housing 63 surrounding the bottom opening of the trough by an extension of the air pressure pipe 54, the branches of said pipe 54 being provided with check valves 56 and 57 to prevent back flow. It will be seen, therefore, that the liquid constituent is delivered to the trough from the measuring device 80 under air pressure delivered from the tank 50, so that said liquid constituent will be sprayed through the jet openings in the plate 61 in the bottom of the tank and will immediately commingle in a more or less atomized form with the solid material delivered into the trough from above.

For the best results, it is desirable that the feed of the constituents of the mixture from the hopper 23 and from the liquid measuring device be concurrent and, to this end, the clutch controlling the feed screw 25 in the hopper and the valves 53 and 55 in the compressed air supply are interconnected, so that they are operated simultaneously. As indicated, the movable clutch member is connected by a link 71 to a bell crank 70 pivoted to the cover 21, the opposite end of the bell crank 70 being connected by a link 72 with a link 73, which, in turn, is connected at its opposite ends to the actuating levers 74 and 75 connected to the valves 53 and 55, respectively, so that, when the clutch members are engaged by moving this link and lever mechanism, the valves 53 and 55 are opened and, conversely, when the clutch is disconnected, said valves are closed.

The operation of the apparatus is as follows: The solid material, usually in comminuted form, is fed to the hopper 23 in regulated quantities and the proper proportion of the liquid constituent of the mixture to be affected in the trough is supplied to the measuring device 80. The stirrer or agitator in the trough is driven by the electric motor 48 and the lever and link mechanism is actuated to engage the clutch members 28 and 29, so that the feed screw will be operated to deliver the solid material from the hopper into the trough through the opening in the cover of the latter. At the same time, the valves 53 and 55 are opened by the mechanism which effects the engagement of the clutch members and air under pressure is delivered to the tank 50 through piping 52 to the nozzle 58, where it has the effect of breaking up the solid material and dispersing the same into a more or less cloud-like form in the trough. At the same time, the air under pressure is delivered by pipe 54 to the bottom opening 60 in the trough and entrains the liquid from the measuring device 80 and forces the same under considerable pressure past the check valve 62 and through the inclined openings in the plate 61, as hereinbefore described, so that the liquid content of the mixture is reduced to a generally atomized condition, as it is forced upward in the trough, where it meets the descending disseminated elements of the solid constituent, whereby immediate union or incorporation of the ingredients is effected, the final mixing and homogenizing being brought about by the rotary stirrer or agitator. After the mixture has been effected, the door 12 is opened and the entire mass of the mixture is immediately freed from the hopper through the open or unobstructed end of the trough.

As a means for regulating the air pressure within the trough during the mixing operation, and particularly for the purpose of avoiding over-pressure therein, I provide outlets 90, 90 in the rear end wall 11 of the trough, which openings, as here shown, open into the opposite ends of a U-shaped pipe 91 which is attached to the outer side of said wall and provided with a vertically ranging extension 92 closed at its upper end by a loosely fitting cap 93. Any over-pressure of air in the trough may be automatically relieved by discharge through the upper end of the pipe extension 92, the cap 93 readily lifting under pressure to permit this.

What I claim is:

1. A mixing machine comprising a trough, means for feeding materials into the trough from above, means for supplying liquid to the trough from below, and a compressed air supply connected with the liquid supply for spraying the liquid upward into the trough.

2. A mixing machine comprising a trough, means for feeding material into the trough from above, means for simultaneously supplying liquid to the trough from below, and a compressed air supply connected with the liquid supply for spraying the liquid upward into the trough.

3. A mixing device comprising a trough, a feed hopper above the same, a liquid inlet at the bottom of the trough, and a compressed air supply connected with the liquid supply for spraying the liquid upward into the trough.

4. A mixing device comprising a trough, a feed hopper above the same, a liquid inlet at the bottom of the trough, an inwardly opening check valve in said inlet, and a compressed air supply connected with the liquid supply for spraying the liquid upward into the trough.

5. A mixing machine comprising a substantially U-shaped trough having one end completely open, a discharge door closing the opening end of said trough, and a rotary agitator journalled in the opposite end of said trough.

6. A mixing machine comprising a substantially U-shaped trough having one end completely open, a discharge door closing the open end of said trough and having a sight opening therein, a transparent closure for said sight opening, and a rotary agitator journalled in the opposite end of said trough.

7. A mixing machine comprising a substantially U-shaped trough having one end completely open, a discharge door closing the open end of said trough and having a sight opening therein, a hinged closure for said sight opening having a transparent section, and a rotary agitator journalled in the opposite end of said trough.

8. A mixing machine comprising a trough, a rotary agitator therein, a cover for said trough, means for feeding material through the cover, and temperature regulating circulation coils adjacent the under face of the cover.

9. A mixing machine comprising a trough, a rotary agitator therein, a cover for said trough, means for feeding material through the cover, temperature regulating circulation coils adjacent the under face of the cover, and a fluid inlet at the bottom of the trough.

10. A mixing machine comprising a substantially U-shaped trough, a rotary agitator therein, a cover for said trough, a hopper on said cover, a feed screw in said hopper, a nozzle for directing an air jet into the discharge opening of the hopper, a fluid inlet in the bottom of the trough, and a fluid measuring device connected to said inlet.

11. A mixing machine comprising a substantially U-shaped trough, a rotary agitator therein, a cover for said trough, a hopper on said cover, a feed screw in said hopper, a nozzle for directing an air jet into the discharge opening of the hopper, a fluid inlet in the bottom of the trough, a fluid measuring device connected to said inlet, and a source of air under pressure connected to said nozzle and said fluid inlet.

12. A mixing machine comprising a substantially U-shaped trough, a rotary agitator therein, a cover for said trough, a hopper on said cover, a feed screw in said hopper, a clutch for connecting said feed screw to its driving means, a nozzle for directing an air jet into the discharge opening of the hopper, a source of air under pressure connected to said nozzle, and means for simultaneously controlling the clutch and air supply to said nozzle.

13. A mixing machine comprising a substantially U-shaped trough, a rotary agitator therein, a cover for said trough, a hopper on said cover, a feed screw in said hopper, a clutch for connecting said feed screw to its driving means, a nozzle for directing an air jet into the discharge opening of the hopper, a valved air pressure supply pipe connected to said nozzle, and lever connections between the clutch and the air valve to operate said elements simultaneously.

14. A mixing machine comprising a substantially U-shaped trough, a rotary agitator therein, a cover for said trough, a hopper on said cover, a feed screw in said hopper, a clutch for connecting said fed screw to its driving means, a nozzle for directing an air jet into the discharge opening of the hopper, a fluid inlet in the bottom of the trough, a fluid measuring device connected to said inlet, valved air pressure supply pipes connected to said nozzle and to the bottom fluid inlet, and link and lever connections between the clutch and the air supply valves to operate said elements simultaneously.

In testimony whereof I affix my signature.

GEORGE J. HICKS.